US009140850B2

(12) United States Patent
Mimura et al.

(10) Patent No.: US 9,140,850 B2
(45) Date of Patent: Sep. 22, 2015

(54) OPTICAL COUPLING STRUCTURE AND OPTICAL FIBER AMPLIFIER

(71) Applicants: FURUKAWA ELECTRIC CO., LTD., Tokyo (JP); TOHOKU GAKUIN, Sendai-shi (JP)

(72) Inventors: Yu Mimura, Tokyo (JP); Hiroshi Matsuura, Miyagi (JP)

(73) Assignees: FURUKAWA ELECTRIC CO., LTD., Tokyo (JP); TOHOKU GAKUIN, Sendai-shi (JP)

( * ) Notice: Subject to any disclaimer, the term of this patent is extended or adjusted under 35 U.S.C. 154(b) by 0 days.

(21) Appl. No.: 14/107,928

(22) Filed: Dec. 16, 2013

(65) Prior Publication Data

US 2015/0168642 A1    Jun. 18, 2015

Related U.S. Application Data

(63) Continuation of application No. PCT/JP2012/065498, filed on Jun. 18, 2012.

(60) Provisional application No. 61/623,267, filed on Apr. 12, 2012, provisional application No. 61/497,776, filed on Jun. 16, 2011.

(51) Int. Cl.
*H01S 3/00* (2006.01)
*G02B 6/02* (2006.01)
(Continued)

(52) U.S. Cl.
CPC .............. *G02B 6/02042* (2013.01); *G02B 6/32* (2013.01); *H01S 3/06737* (2013.01); *G02B 6/2937* (2013.01); *G02B 6/2938* (2013.01)

(58) Field of Classification Search
CPC ............................ G02B 6/2938; G02B 6/2937

USPC .................. 359/341.3; 385/24, 46; 349/341.3
See application file for complete search history.

(56) References Cited

U.S. PATENT DOCUMENTS

| 5,566,196 A | 10/1996 | Scifres |
| 5,682,452 A | 10/1997 | Takahashi |

(Continued)

FOREIGN PATENT DOCUMENTS

| JP | 58-158610 A | 9/1983 |
| JP | 61-259208 A | 11/1986 |

(Continued)

OTHER PUBLICATIONS

Office Action issued Apr. 30, 2014 in Japanese Patent Application No. 2013-520621 (with English language translation).

(Continued)

*Primary Examiner* — Mark Hellner
(74) *Attorney, Agent, or Firm* — Oblon, McClelland, Maier & Neustadt, L.L.P.

(57) ABSTRACT

An optical coupling structure optically coupling a plurality of core portions and a plurality of core portions includes a plurality of first core portions outputting a plurality of lights, a first lens focusing or collimating the plurality of lights outputted from the plurality of first core portions, a second lens focusing the plurality of lights focused or collimated by the first lens, a plurality of second core portions, the plurality of lights focused by the second lens being inputted into the second core portions respectively, and an optical functional component disposed between the first lens and the second lens, the plurality of lights being inputted into the optical functional component. At least one of the first lens and the second lens is configured by a lens or a lens group focusing or collimating the plurality of lights collectively.

10 Claims, 10 Drawing Sheets

(51) Int. Cl.
*G02B 6/32* (2006.01)
*H01S 3/067* (2006.01)
*G02B 6/293* (2006.01)

(56) References Cited

U.S. PATENT DOCUMENTS

| | | |
|---|---|---|
| 5,703,987 A | 12/1997 | Imoto |
| 5,742,722 A | 4/1998 | Imoto |
| 7,006,726 B2 * | 2/2006 | Hayes ........................ 385/27 |
| 7,289,707 B1 | 10/2007 | Chavez-Pirson et al. |
| 2003/0174937 A1 * | 9/2003 | Huang et al. .................. 385/24 |
| 2003/0179993 A1 | 9/2003 | Shigenaga et al. |
| 2004/0264513 A1 | 12/2004 | Shima et al. |
| 2007/0217741 A1 | 9/2007 | Shigenaga et al. |
| 2009/0154929 A1 | 6/2009 | Yoshida |

FOREIGN PATENT DOCUMENTS

| | | |
|---|---|---|
| JP | 06-130244 A | 5/1994 |
| JP | 08-292342 A | 11/1996 |
| JP | 08-304857 A | 11/1996 |
| JP | 09-230156 A | 9/1997 |
| JP | 09-274119 A | 10/1997 |
| JP | 10-125988 A | 5/1998 |
| JP | 11-233863 A | 8/1999 |
| JP | 2001-230476 A | 8/2001 |
| JP | 2001-264572 A | 9/2001 |
| JP | 2001-264586 A | 9/2001 |
| JP | 2004-045646 A | 2/2004 |
| JP | 2004-325812 A | 11/2004 |
| JP | 2005-019539 A | 1/2005 |
| JP | 2005-109036 A | 4/2005 |
| JP | 2008-052284 A | 3/2008 |
| JP | 2009-164565 A | 7/2009 |

OTHER PUBLICATIONS

Arturo Chavez-Pirson, et al., "Wide Field of View Image Amplifier Based on Yb-Doped Multi-Core Phosphate Optical Fiber" 2005 Conference on Lasers & Electro-Optics, vol. 3, May 2005, pp. 1978-1980.

International Search Report issued Aug. 14, 2012 in PCT/JP2012/065498 filed Jun. 18, 2012.

Kurmmrich, P. M. et al., "Evaluation of Potential Optical Amplifier Concepts for Coherent Mode Multiplexing," Optical Fiber Communication Conference and Exposition (OFC/NFOEC) 2011 and The National Fiber Optic Engineers Conference, Mar. 2011, OMH5.

U.S. Appl. No. 14/245,672, filed Apr. 4, 2014, Tsuchida, et al.

Extended European Search Report issued May 22, 2015 in Patent Application No. 12800261.5

* cited by examiner

OPTICAL COUPLING STRUCTURE AND OPTICAL FIBER AMPLIFIER

CROSS-REFERENCE TO RELATED APPLICATION

This application is a continuation of PCT International Application No. PCT/JP2012/065498 filed on Jun. 18, 2012 which claims the benefit of priority from U.S. Provisional Patent Application No. 61/497,776 filed on Jun. 16, 2011 and No. 61/623,267 filed on Apr. 12, 2012, the entire contents of which are incorporated herein by reference.

BACKGROUND OF THE INVENTION

1. Field of the Invention

The present invention relates to an optical coupling structure optically coupling a plurality of cores mutually and an optical fiber amplifier.

2. Description of the Related Art

In case of using a multi-core optical fiber in which a plurality of cores are disposed in a cladding, there is a case that an optical functional component such as an optical isolator or an optical filter etc. is inserted between two multi-core optical fibers. In addition, in case that a multi-core optical fiber has an optical amplification function, there is a case that an optical component inputting pumping light into the multi-core optical fiber is inserted between two multi-core optical fibers (for example, see Japanese Laid-open Patent Publication No. H10-125988 or P. M. Krummrich and Klaus Petermann, "Evaluation of Potential Optical Amplifier Concept for Coherent Mode Multiplexing", OFC2011, OMH5.).

SUMMARY OF THE INVENTION

It is an object of the present invention to at least partially solve the problems in the conventional technology.

In accordance with one aspect of the present invention, an optical coupling structure optically coupling a plurality of core portions and a plurality of core portions, the optical coupling structure includes: a plurality of first core portions outputting a plurality of lights; a first lens focusing or collimating the plurality of lights outputted from the plurality of first core portions; a second lens focusing the plurality of lights focused or collimated by the first lens; a plurality of second core portions, the plurality of lights focused by the second lens being inputted into the second core portions respectively; and an optical functional component disposed between the first lens and the second lens, the plurality of lights being inputted into the optical functional component. At least one of the first lens and the second lens is configured by a lens or a lens group focusing or collimating the plurality of lights collectively.

In accordance with another aspect of the present invention, an optical fiber amplifier includes an optical coupling structure optically coupling a plurality of core portions and a plurality of core portions, the optical coupling structure includes: a plurality of first core portions outputting a plurality of lights; a first lens focusing or collimating the plurality of lights outputted from the plurality of first core portions; a second lens focusing the plurality of lights focused or collimated by the first lens; a plurality of second core portions, the plurality of lights focused by the second lens being inputted into the second core portions respectively; and an optical functional component disposed between the first lens and the second lens, the plurality of lights being inputted into the optical functional component. At least one of the first lens and the second lens is configured by a lens or a lens group focusing or collimating the plurality of lights collectively.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments of an optical coupling structure and an optical fiber amplifier according to the present invention will be explained in detail with reference to the drawings. It should be noted that the invention is not limited by these embodiments. In addition, in each drawing, identical or equivalent elements are given same reference numerals. Furthermore, it must be noted that the drawings are schematic depictions, and may not represent the actual relation of dimension of each element. In some cases, different drawings may include portions using different scales and dimensional relations.

Since the structure disclosed by P. M. Krummrich and Klaus Petermann, "Evaluation of Potential Optical Amplifier Concept for Coherent Mode Multiplexing", OFC2011, OMH5. optically couples the plurality of cores mutually by using a lens array constituted by a plurality of lenses disposed to correspond to each core, there is a problem that the number of components constituting the structure for optical coupling increases and the structure becomes complex.

In contrast, according to the present embodiments, an effect capable of realizing an optical coupling structure with a simple structure is obtained.

Figure 1:
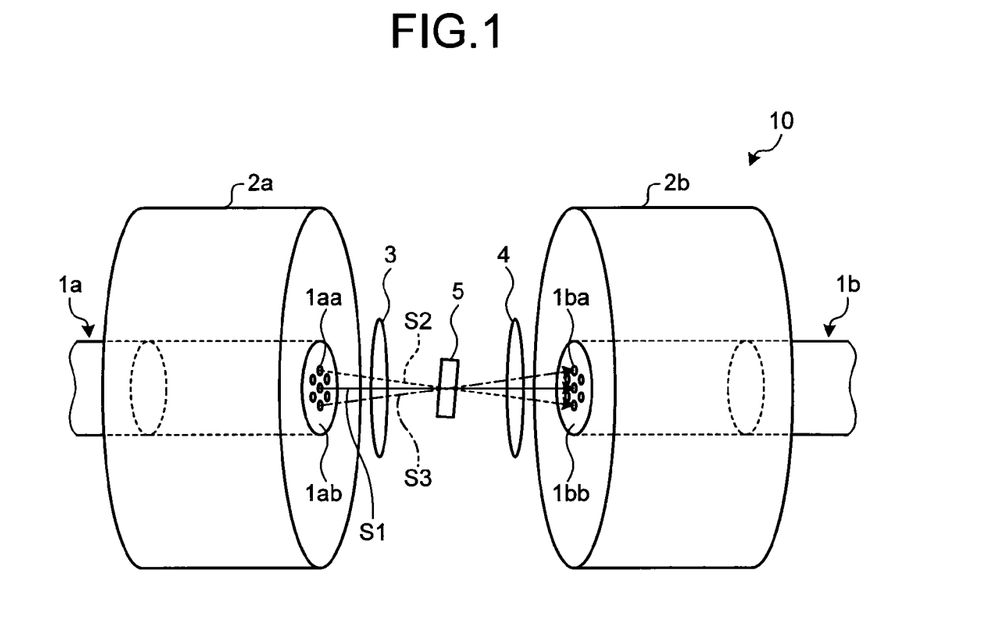
FIG. 1 is a schematic view of an optical coupling structure according to an embodiment 1.

FIG. 1 is a schematic view of an optical coupling structure according to an embodiment 1 of the present invention. An optical coupling structure 10 is constituted by multi-core optical fibers 1a and 1b so that respective facets are disposed to oppose to each other, ferrules 2a and 2b through which the multi-core optical fibers 1a and 1b are inserted respectively, a lens 3 as a first lens, a lens 4 as a second lens, and an optical functional component 5.

The multi-core optical fiber 1a is made from silica-based glass and includes seven core portions 1aa as a plurality of first core portions and a cladding portion 1ab formed at outer peripheries of the core portions 1aa. The seven core portions 1aa constitute the multi-core optical fiber 1a so that six core portions are disposed to form a regular hexagon around outside the center one of the core portions disposed in the vicinity of a center axis of the cladding portion 1ab. Similarly, the multi-core optical fiber 1b is made from silica-based glass and includes seven core portions 1ba as a plurality of second core portions and a cladding portion 1bb formed at outer peripheries of the core portions 1ba. The seven core portions 1ba constitute the multi-core optical fiber 1b so that six core portions are disposed to form a regular hexagon around outside the center one of the core portions disposed in the vicinity of a center axis of the cladding portion 1bb.

The ferrules 2a and 2b are made from, for example, ceramics. The multi-core optical fibers 1a and 1b are inserted through, and fixed to, the ferrules 2a and 2b respectively. Respective facets of the multi-core optical fibers 1a and 1b are positioned to be flush with respective facets of the ferrules 2a and 2b.

Each core portion 1aa outputs a signal light having been propagated through each core portion 1aa. The wavelength of the signal light is, for example, a wavelength in 1.55 μm wavelength band which is frequently used in optical communication. It should be noted that, although signal lights are outputted from all of the seven core portions 1aa, for the purpose of simplifying the description, as signal light herein, a signal light S1 outputted from the center one of the core portions 1aa and signal lights S2 and S3 outputted from the core portions disposed in a vertical direction of the drawing with respect to the center one of the core portions are typified and described.

The lens 3 is configured so that the signal lights S1, S2, and S3 outputted from the core portions 1aa are collimated collectively. The lens 3 is configured as, for example, a spherical lens or an aspherical lens.

The collimated signal lights S1, S2, and S3 are inputted into the optical functional component 5. The optical functional component 5 is a component such as, for example, an optical isolator or an optical filter etc., exerting a predetermined function to inputted lights. It is preferable that the signal lights S1, S2, and S3 are inputted as collimated parallel lights because thereby the optical functional component 5 can exert its function the most effectively to the signal lights S1, S2, and S3.

The lens 4 is configured so that each of the signal lights S1, S2, and S3 outputted from the optical functional component 5 is focused to corresponding one of the seven core portions 1ba of the multi-core optical fiber 1b. The lens 4 is configured as, for example, a spherical lens or an aspherical lens.

Figure 2:
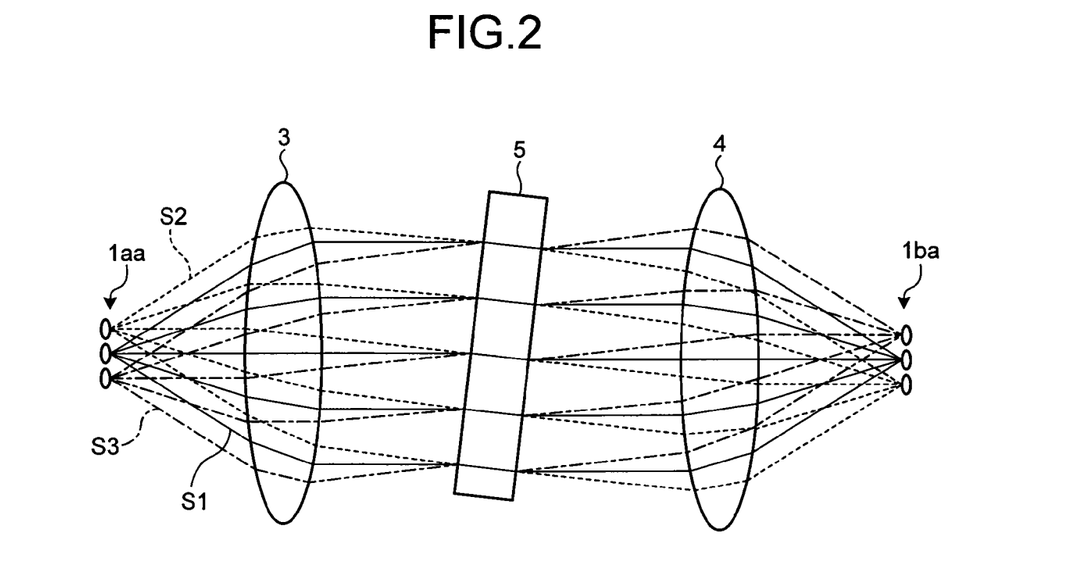
FIG. 2 is a drawing showing optical paths of signal lights in FIG. 1.

FIG. 2 is a drawing showing optical paths of the signal lights S1, S2, and S3 in FIG. 1. The optical coupling structure 10 realizes optical coupling between the core portions 1aa and the core portions 1ba by collimating the signal lights S1, S2, and S3 outputted from the core portions 1aa collectively by the lens 3 in one piece and focusing the collimated signal lights collectively to the corresponding one of the core portions 1ba by the lens 4 in one piece. It should be noted that the signal lights S2 and S3 outputted from the upper or the lower one of the core portions 1aa with respect to the center are inverted vertically and focused to each core portion 1ba. This reduces the more number of components constituting an optical coupling structure, simplifies the structure to a greater extent compared to a conventional case where optical coupling is conducted among a plurality of core portions by using a lens array constituted by a plurality of lenses corresponding to the number of the core portion. In addition, since this reduces greater number of lenses to be used, positions between lenses can be adjusted easily.

In addition, since orientation of the multi-core optical fiber in the rotational direction can be distinguished easily by, for example, disposing a marker at the ferrule 2a, 2b, etc. corresponding to the position of a particular core, it is possible to distinguish the position of the corresponding core at an input/output facet of the optical coupling structure 10 by configuring the optical coupling structure 10 so that the marker is inverted vertically. It is further preferable to dispose a marker to a multi-core optical fiber similarly to correspond to the marker disposed to the ferrule.

It should be noted that optical coupling loss between the core portions 1aa and the core portions 1ba can be low as, for example, approximately equal to or lower than 0.3 dB if interval between the core portions 1aa and interval between the core portions 1ba are approximately equal to or lower than 62.5 μm respectively.

Figure 3:
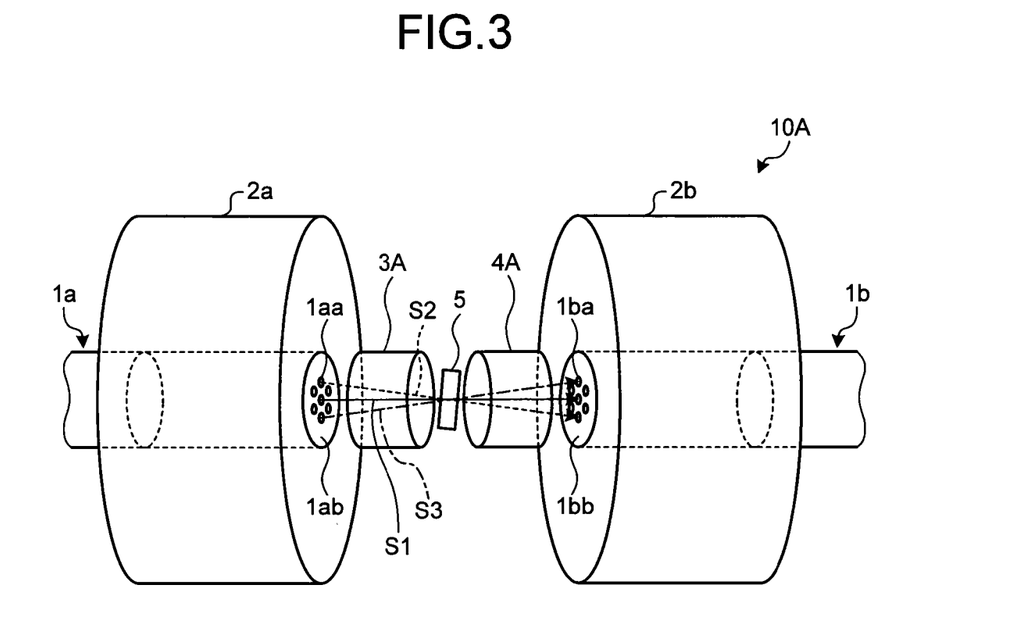
FIG. 3 is a schematic view of an optical coupling structure according to an embodiment 2.

FIG. 3 is a schematic view of an optical coupling structure according to an embodiment 2 of the present invention. An optical coupling structure 10A has the structure in which the lenses 3 and 4 in the optical coupling structure 10 according to the embodiment 1 shown in FIG. 1 are replaced with gradient-index (GRIN)-type lenses 3A and 4A respectively.

The optical coupling structure 10A realizes optical coupling between the core portions 1aa and the core portions 1ba by collimating the signal lights S1, S2, and S3 outputted from the core portions 1aa collectively by the GRIN lens 3A in one piece and focusing the collimated signal lights collectively to the corresponding core portions 1ba by the GRIN lens 4A in one piece. Similarly to the embodiment 1, this can reduce the number of components constituting the optical coupling structure, and simplify the configuration.

Figure 4:
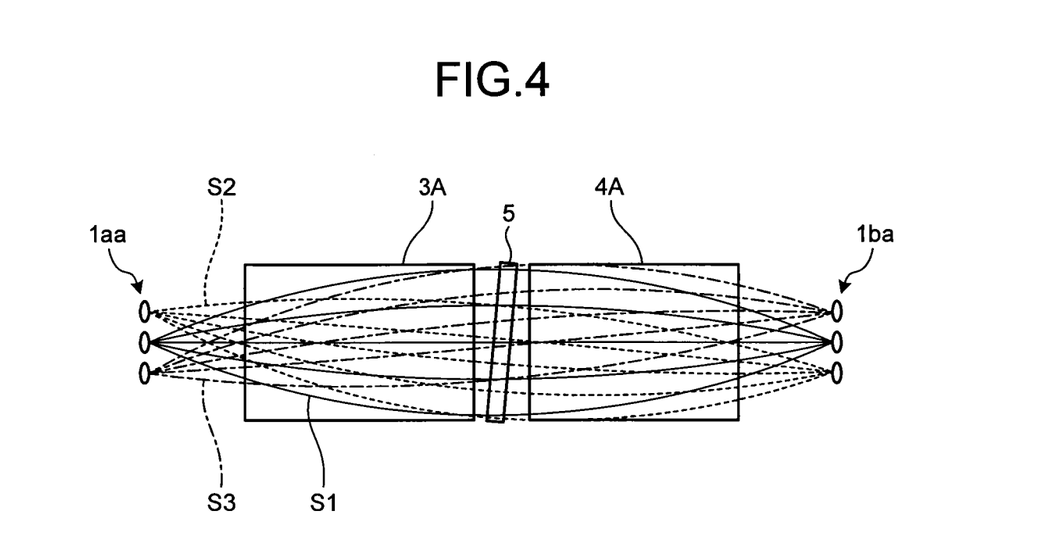
FIG. 4 is a drawing showing an example of optical paths of signal lights in FIG. 3.

FIG. 4 is a drawing showing an example of optical paths of signal lights S1, S2, and S3 in FIG. 3. The lengths or the refractive index distributions of the GRIN lenses 3A and 4A shown in FIG. 4 are designed so that the signal lights S1, S2, and S3 are focused on the core portions 1ba as images inverted vertically relative to a state of being outputted from the core portions 1aa.

It should be noted that, although the GRIN lenses 3A and 4A, the optical functional component 5, and the multi-core optical fibers 1a and 1b are disposed to be separated from one another in FIG. 3, these components may contact directly with one another and fixed by adhesive etc. By doing this, the configuration and production can be facilitated furthermore.

Figure 5:
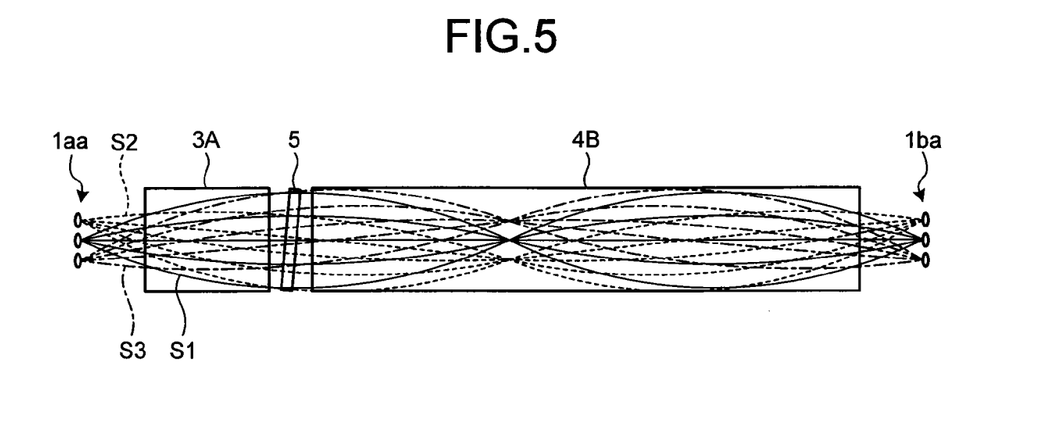
FIG. 5 is a drawing showing optical paths in an optical coupling structure according to a modification example of the embodiment 2.

FIG. 5 is a drawing showing optical paths in an optical coupling structure according to a modification example of the embodiment 2. This optical coupling structure has the structure in which the GRIN lens 4A in the optical coupling structure 10A is replaced with a GRIN lens 4B. The GRIN lens 4B is configured to be longer than the GRIN lens 4A. By doing this, the GRIN lens 4B focuses an inverted image inside the GRIN lens, and after that, focuses an image so that positional relationship of the signal lights S1, S2, and S3 becomes positional relationship for an erect image. In this manner, the GRIN lens 4B may be used in place of the GRIN lens 4A. It should be noted that, in place of the GRIN lens 4A, the GRIN lens 3A may be elongated like the GRIN lens 4B.

As described above, the optical coupling structure using the GRIN lens forms an inverted image at least once between a core portion outputting light and a core portion into which light is inputted. In addition, as for GRIN lenses, an optical functional component is disposed between two GRIN lenses in a state in which the GRIN lenses are disposed so that light outputted from each core portion of the multi-core optical fiber become substantial collimated light between the GRIN lenses as shown in FIG. 4 or FIG. 5. By doing this, parallel light is inputted into the optical functional component. It should be noted that, in case of an erect image being formed as shown in FIG. 5, there are a plurality of points where the light outputted from each core portion becomes a collimated light. That is, for example, in FIG. 5, a point exists in the GRIN lens 4B where the signal lights S1, S2, and S3 become collimated lights. In this case, the GRIN lens 4B may be divided into two portions at a point where the signal lights S1, S2, and S3 become collimated light and an optical functional component may be interposed between the divided portions of the GRIN lens. In addition, since an inverted image and an erect image are formed alternately, the length and the refractive index distribution of the GRIN lens may be set so that either of the inverted image and the erect image is formed multiple times. The GRIN lens in this state may be divided at each of multiple points where a light outputted from the core portion becomes collimated light, and optical functional components may be interposed between each of the divided GRIN lens similarly to the above description.

Figure 6:
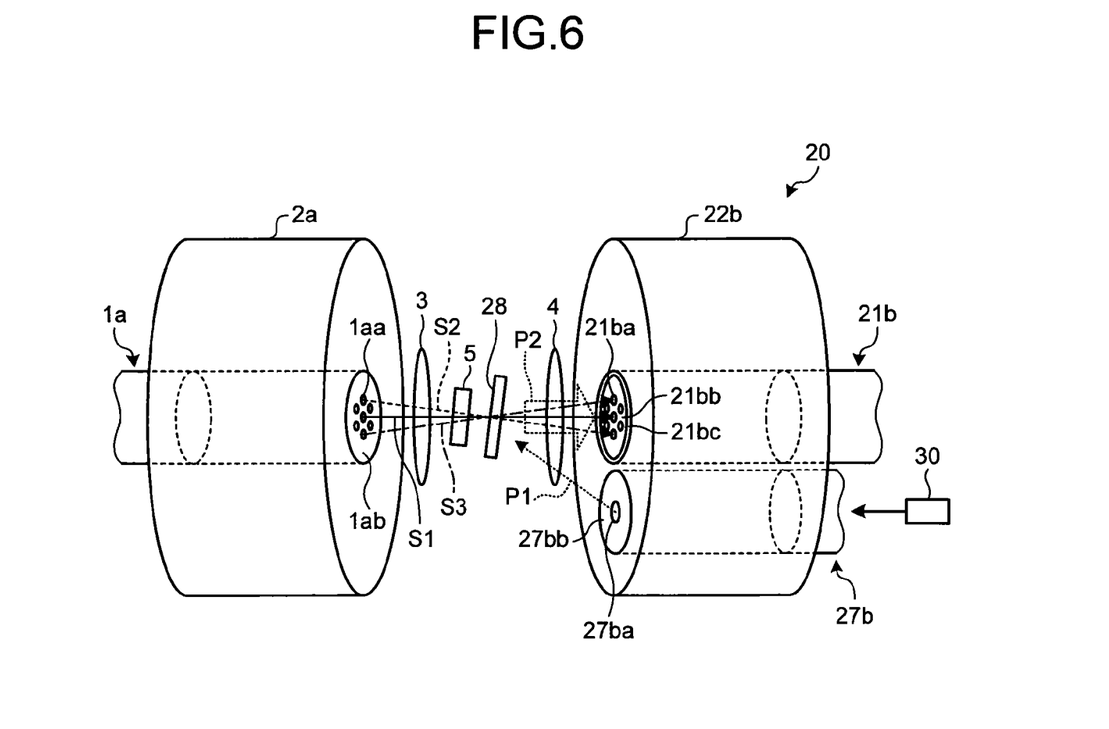
FIG. 6 is a schematic view of an optical coupling structure according to an embodiment 3.

FIG. 6 is a schematic view of an optical coupling structure according to an embodiment 3 of the present invention. An optical coupling structure 20 is constituted by multi-core optical fibers 1*a* and 21*b* so that respective facets are disposed to oppose to each other, ferrules 2*a* and 22*b* through which the multi-core optical fibers 1*a* and 21*b* are inserted respectively, the lens 3 as the first lens, the lens 4 as the second lens, the optical functional component 5, an optical filter 28 as an optical functional component, and a pumping-light-introducing optical fiber 27*b* inserted through the ferrule 22*b*.

Since the configurations for the multi-core optical fiber 1*a*, the ferrule 2*a*, the lens 3, the lens 4, and the optical functional component 5 are the same as those corresponding to the components of the embodiment 1 shown in FIG. 1, description for them is omitted.

The multi-core optical fiber 21*b* includes seven core portions 21*ba* as a plurality of second core portions, an inner cladding potion 21*bb* formed at outer peripheries of the core portions 21*ba*, and an outer cladding portion 21*bc* formed at an outer periphery of the inner cladding potion 21*bb*.

The core portion 21*ba* is made from silica-based glass which is doped with a rare earth element such as erbium (Er), ytterbium (Yb), neodymium (Nd), or thulium (Tm), etc. The inner cladding potion 21*bb* is made from silica-based glass of which refractive index is lower than that of the core portion 21*ba*. The outer cladding portion 21*bc* is made from, for example, optical resin of which refractive index is lower than that of the inner cladding potion 21*bb*.

That is, the multi-core optical fiber 21*b* is configured as a double-cladding type optical gain fiber.

The pumping-light-introducing optical fiber 27*b* is made from silica-based glass and includes a pumping-light-introducing core portion 27*ba* and a cladding portion 27*bb* formed at an outer periphery of the pumping-light-introducing core portion 27*ba*. The pumping-light-introducing optical fiber 27*b* outputs a pumping light P1, outputted from a pumping light source 30 such as semiconductor laser etc. and having propagated through the pumping-light-introducing core portion 27*ba*, from the pumping-light-introducing core portion 27*ba*. The wavelength of the pumping light P1 is wavelength capable of optically pumping the rare earth element doped to the core portion 21*ba* of the multi-core optical fiber 21*b*, and is 0.98 μm wavelength band etc., for example, in case of Er. In addition, various kinds of optical fiber, such as a single mode optical fiber, a multi-mode optical fiber, or a multi-core optical fiber of single mode or multi-mode can be used for the pumping-light-introducing optical fiber 27*b*. For the pumping light source 30, a single mode pumping light source or a multi-mode-pumping light source can be used in accordance with the kind of the pumping-light-introducing optical fiber 27*b*.

The ferrule 22*b* is a kind of ferrule called as a duplex ferrule. The multi-core optical fiber 21*b* and the pumping-light-introducing optical fiber 27*b* are inserted through and fixed to the ferrule 22*b*. Respective facets of the multi-core optical fiber 21*b* and the pumping-light-introducing optical fiber 27*b* are positioned to be flush with a facet of the ferrule 22*b*. In the present embodiment 3, although the multi-core optical fiber 21*b* and the pumping-light-introducing optical fiber 27*b* in a state of being parallel with each other are inserted through the ferrule 22*b*, they may be inserted in a state of being oblique to each other.

The optical filter 28 made of, for example, a dielectric multilayered filter is configured and disposed to reflect the pumping light P1 introduced by the lens 4 and make the reflected pumping light P1 inputted into the inner cladding potion 21*bb* of the multi-core optical fiber 21*b* as the pumping light P2. In addition, the optical filter 28 has wavelength characteristics of reflecting light at the wavelength of the pumping light P1 but transmits therethrough light at the wavelengths of the signal lights S1, S2, and S3 as described hereinafter. The pumping light P2 reflected by the optical filter 28 is coupled with each core portion 21*ba* gradually while being propagated in the inner cladding potion 21*bb* of the multi-core optical fiber 21*b* and pumps the rare earth element doped to each of the core portions 21*ba*. By doing this, the pumping light P2 can pump the seven core portions 21*ba* collectively.

Herein when the signal lights S1, S2 and S3 (1.55 μm wavelength band or 1.58 μm wavelength band etc., in case of, for example, Er) to be amplified optically have been propagated through and outputted from the multi-core optical fiber 1*a*, the optical coupling structure 20 realizes optical coupling between the core portions 1*aa* and the core portions 21*ba* by collimating the signal lights S1, S2, and S3 collectively by the lens 3 in one piece and focusing the collimated signal lights collectively to the corresponding core portions 21*ba* by the lens 4 in one piece. Each of the signal lights S1, S2, and S3 subjected to optical coupling to the core portions 21*ba* is, while being propagated in each of the core portions 21*ba*, subjected to optical amplification by an act of stimulated emission of the rare earth element.

As described above, the optical coupling structure 20 realizes optical coupling with a simple configuration for optical amplification.

It should be noted that, although the distance between center axes of the multi-core optical fiber 21*b* and the pumping-light-introducing optical fiber 27*b* is, for example, equal to or longer than 125 μm, since this is not large to a significant degree, a reflection angle at which the pumping light P1 is reflected by the optical filter 28 to become the pumping light P2 is extremely small. Therefore, it is possible to reduce optical coupling loss of the pumping light between the pumping-light-introducing optical fiber 27b and the multi-core optical fiber 21b by adjusting the angle at which the optical filter 28 is tilted.

In addition, for the purpose of enhancing coupling efficiency for the pumping light P2, it is preferable that the optical filter 28 makes the pumping light P2 input into the inner cladding potion 21bb so that the optical axis of the pumping light P2 coincides with the center axis of the inner cladding potion 21bb of the multi-core optical fiber 21b. Therefore, for realizing this, it is preferable that the position or the angle etc. of the optical filter 28 is adjusted. However, the position at which the optical filter 28 makes the pumping light P2 input onto the inner cladding potion 21bb is not limited specifically, the position at which the pumping light P2 is inputted can be set arbitrarily by adjusting the position or the angle etc. of the optical filter 28. The pumping state and the gain of each core portion 21ba can be varied by adjusting the position at which the pumping light P2 is made input. Therefore, for example, the position at which the pumping light P2 is made input may be adjusted so that the gains at the respective core portions 21ba become more uniform.

In addition, the optical coupling structure 20 has a configuration which can be adapted to so-called forward pumping type of pumping method, in which the propagation directions of the signal lights S1, S2, and S3 are identical with the propagation direction of the pumping light P2. However, if propagation directions of the signal lights S1, S2, and S3 are changed so that the core portions 21ba are the first core portions outputting signal lights and the core portions 1aa are the second core portions into which the signal lights are inputted, the propagation directions of the signal lights S1, S2, and S3 are opposite to the propagation direction of the pumping light P2. By doing this way, it is possible to configure an optical coupling structure which can be adapted to backward pumping type of pumping method.

Figure 7:
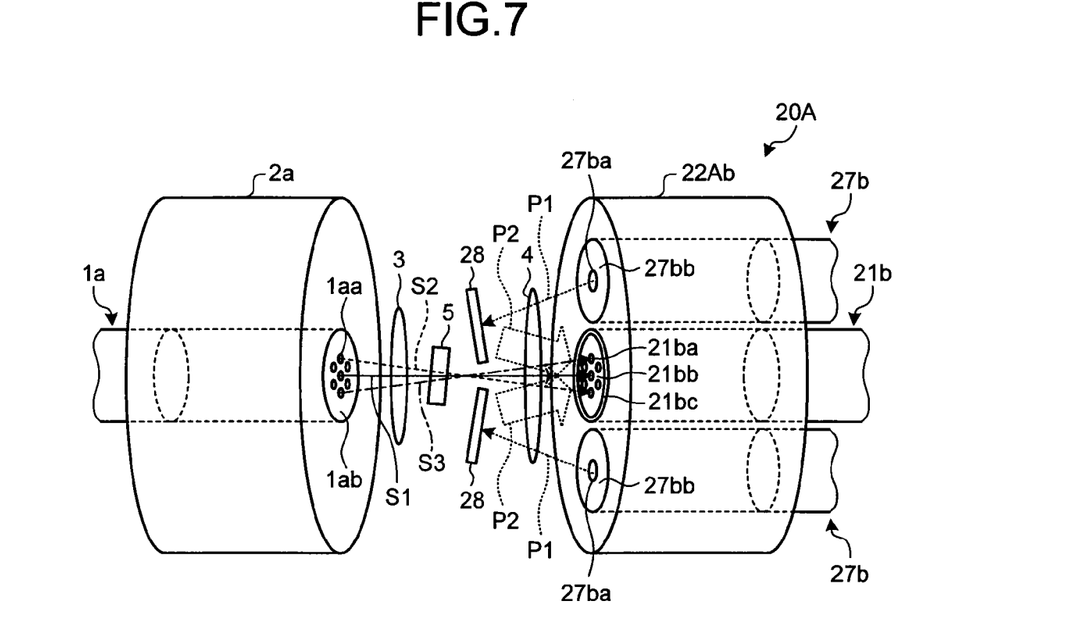
FIG. 7 is a schematic view of an optical coupling structure according to an embodiment 4.

FIG. 7 is a schematic view of an optical coupling structure according to an embodiment 4. An optical coupling structure 20A shown in FIG. 7 has the structure in which the ferrule 22b in the optical coupling structure 20 according to the embodiment 3 shown in FIG. 6 is replaced with a ferrule 22Ab. The multi-core optical fiber 21b and a plurality of the pumping-light-introducing optical fibers 27b are inserted through and fixed to the ferrule 22Ab so that respective facets of the multi-core optical fiber 21b and the pumping-light-introducing optical fibers 27b are positioned to be flush with a facet of the ferrule 22Ab. Furthermore, the optical filters 28 are disposed in the same number of the pumping-light-introducing optical fibers 27b.

Figure 8:
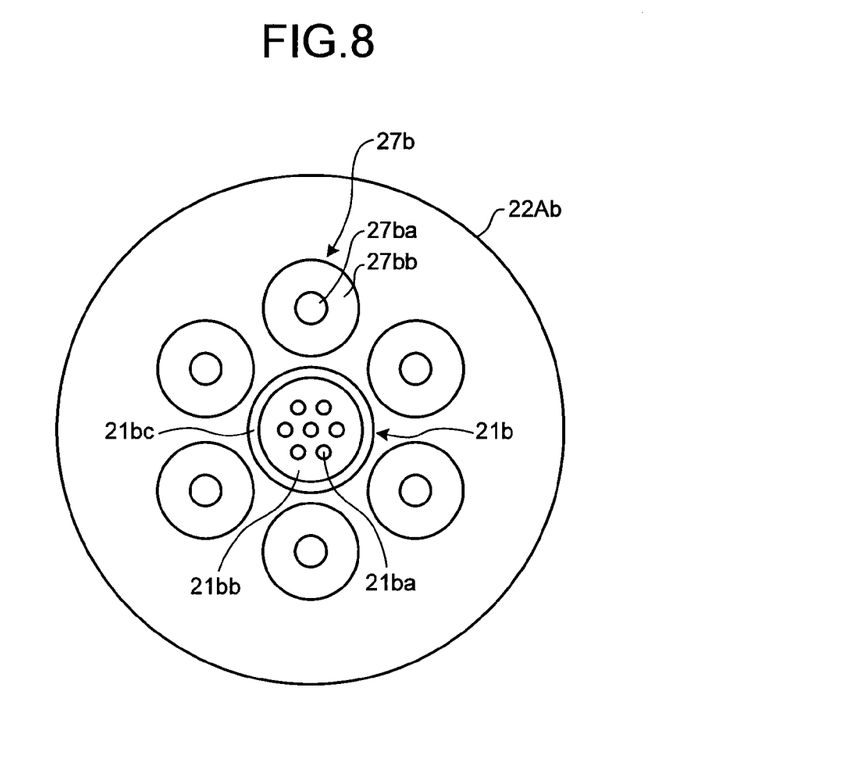
FIG. 8 is a drawing showing a facet of a ferrule shown in FIG. 7.

FIG. 8 is a drawing showing a facet of the ferrule 22Ab shown in FIG. 7.

As shown in FIG. 8, the multi-core optical fiber 21b is disposed at the center of the ferrule 22Ab, and the six pumping-light-introducing optical fibers 27b are disposed to form a regular hexagon around outside the multi-core optical fiber 21b. It should be noted that, for the purpose of simplifying FIG. 7, only the pumping-light-introducing optical fibers 27b disposed in the vertical direction of the drawing with respect to the multi-core optical fiber 21b are described.

In addition, each of the optical filter 28s is configured and disposed to reflect the pumping light P1 outputted from the corresponding pumping-light-introducing core portion 27ba of the pumping-light-introducing optical fiber 27b and make the reflected pumping light P1 input, as the pumping light P2, to the inner cladding potion 21bb of the multi-core optical fiber 21b.

Since in the optical coupling structure 20A, the plurality of pumping lights P1, outputted from the pumping-light-introducing core portions 27ba of the six pumping-light-introducing optical fibers 27b are reflected by the plurality of optical filters 28 and the reflected pumping lights P1 are made input into the inner cladding potions 21bb of the multi-core optical fiber 21b, the core portion 21ba can be pumped at a higher optical power.

It should be noted that, as shown in FIG. 7 in case of disposing the optical filters 28 so as not to interfere with the signal lights S1, S2, and S3, the optical filters 28 may not necessarily have to transmit light at wavelengths of those of the signal lights S1, S2, and S3 therethrough.

Figure 9:
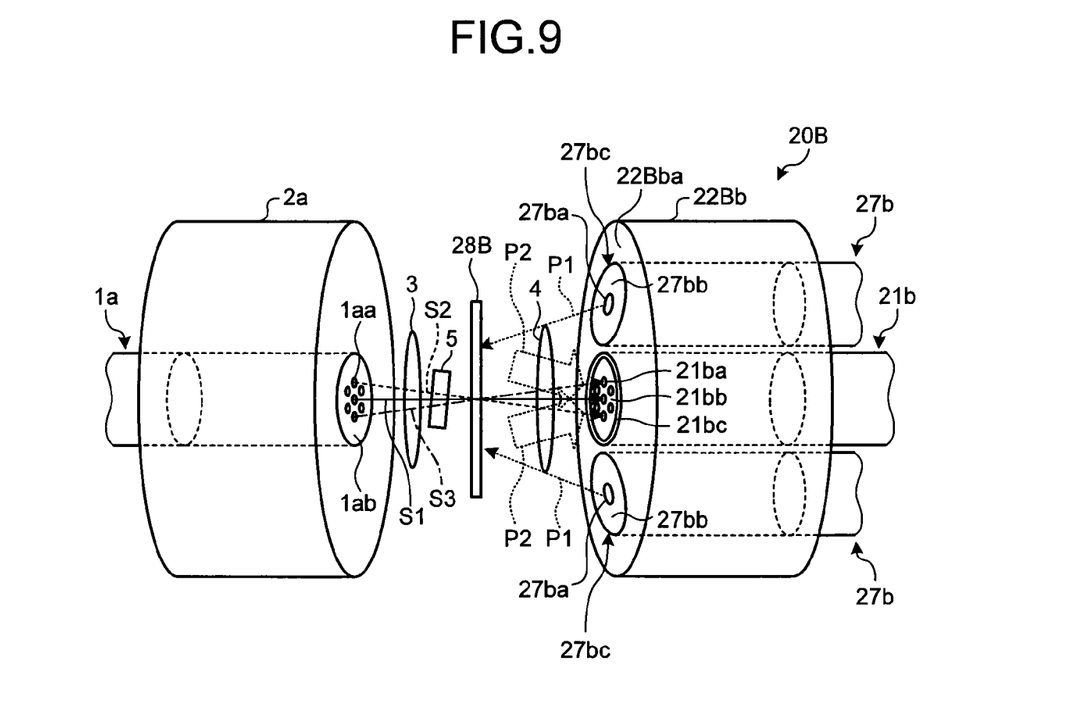
FIG. 9 is a schematic view of an optical coupling structure according to an embodiment 5.

FIG. 9 is a schematic view of an optical coupling structure according to an embodiment 5. An optical coupling structure 20B shown in FIG. 9 has a configuration in which the ferrule 22Ab is replaced with a ferrule 22Bb and the plurality of optical filters 28 is replaced with an optical filter 28B in one piece in the optical coupling structure 20A in the embodiment 4 shown in FIG. 7.

Figure 10:
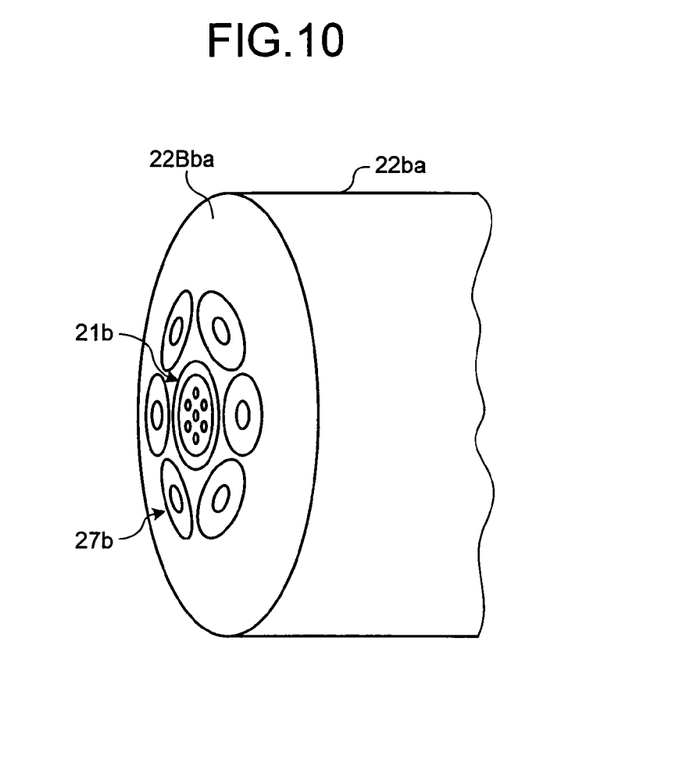
FIG. 10 is a drawing showing a facet of a ferrule shown in FIG. 9.

FIG. 10 is a drawing showing a facet of the ferrule 22Bb shown in FIG. 9.

As shown in FIG. 10, the multi-core optical fiber 21b is disposed at the center of the ferrule 22Bb, and the six pumping-light-introducing optical fibers 27b are disposed to form a regular hexagon around outside the multi-core optical fiber 21b. It should be noted that, for the purpose of simplifying FIG. 9, only the pumping-light-introducing optical fibers 27b disposed in the vertical direction of the drawing with respect to the multi-core optical fiber 21b are described.

A facet 22Bba of the ferrule 22Bb is of a shape formed by cutting a tip portion from a cone at a surface perpendicular to the center axis of the cone. Since the pumping-light-introducing optical fibers 27b inserted through the ferrule 22Bb are shaped so that their facets are positioned to be flush with the facet 22Bba of the ferrule 22Bb, each facet of the pumping-light-introducing optical fiber 27b inclines outward with respect to the center (to a side of the multi-core optical fiber 21b). As a result of that, every pumping light P1 outputted from the pumping-light-introducing core portion 27ba of each of the pumping-light-introducing optical fiber 27b is outputted at an angle inclined inward with respect to the center.

As a result of that, by disposing the optical filter 28B so that its main surface is perpendicular to the center axis of the multi-core optical fiber 21b (or the optical axis of the signal light S1), it is possible to reflect the pumping lights P1, outputted from all of the pumping-light-introducing core portions 27ba, collectively by the optical filter 28B in one piece and make the reflected pumping lights P1 input into the inner cladding potion 21bb of the multi-core optical fiber 21b as the pumping lights P2. By doing this, the number of the optical filters to be used can be reduced.

Figure 11:
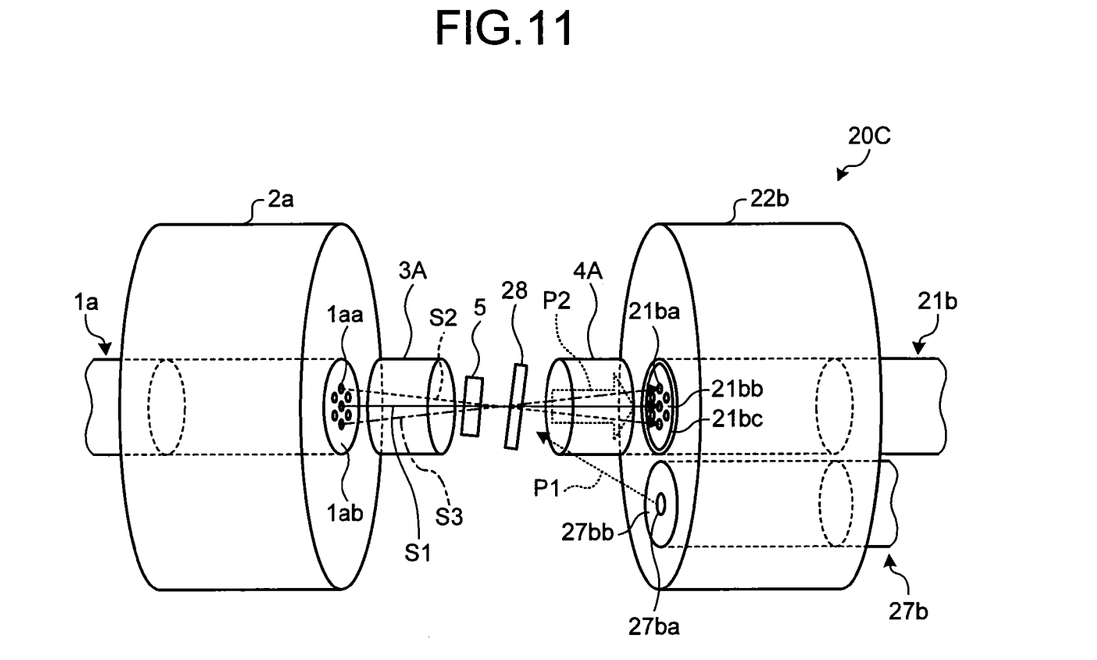
FIG. 11 is a schematic view of an optical coupling structure according to an embodiment 6.

FIG. 11 is a schematic view of an optical coupling structure according to an embodiment 6. An optical coupling structure 20C shown in FIG. 11 has the structure in which the lenses 3 and 4 in the optical coupling structure 20 according to the embodiment 3 shown in FIG. 6 are replaced with GRIN lenses 3A and 4A respectively.

As described above, also the optical coupling structure 20C using the GRIN lenses realizes optical coupling for optical amplification with a simple configuration.

Figure 12:
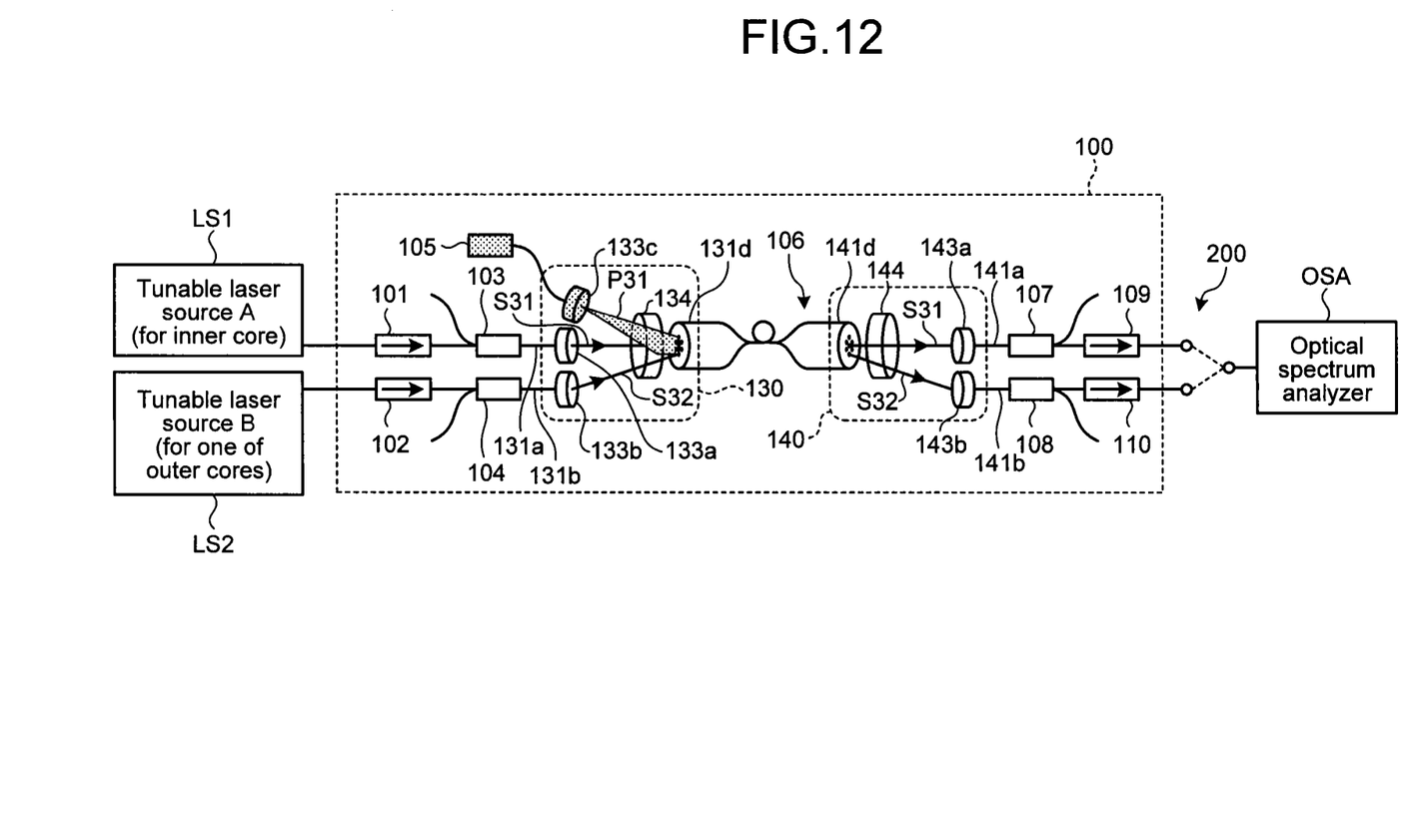
FIG. 12 is a schematic view of an optical fiber amplifier according to an embodiment 7.

FIG. 12 is a schematic view of an optical fiber amplifier according to an embodiment 7 of the present invention. As shown in FIG. 12, a cladding-pumping type optical fiber amplifier 100 includes optical isolators 101 and 102, wavelength division multiplexing (WDM) couplers 103 and 104, a pumping laser diode (LD) 105, an optical coupling structure 130, a multi-core erbium-doped optical fiber (EDF) 106, an optical coupling structure 140, WDM couplers 107 and 108, and optical isolators 109 and 110.

The optical isolator 101 receives a signal light (for example, at a wavelength of 1520 nm to 1620 nm) outputted from a tunable laser source LS1 disposed outside the optical fiber amplifier 100, and outputs the received signal light to the WDM coupler 103. The WDM coupler 103 transmits therethrough and outputs the signal light to the optical coupling structure 130. Similarly, the optical isolator 102 receives signal light outputted from a tunable laser source LS2 disposed outside the optical fiber amplifier 100, and outputs the received a signal light to the WDM coupler 104. The WDM coupler 104 transmits therethrough and outputs the signal light to the optical coupling structure 130.

The multi-core EDF 106 is a double-cladding type multi-core optical fiber having a configuration similar to that of the multi-core optical fiber 21b shown in FIG. 6 and includes seven core portions, an inner cladding potion formed at an outer periphery of the core portion, and an outer cladding portion formed at an outer periphery of the inner cladding potion. One of the seven core portions is disposed in the vicinity of the center axis of the inner cladding potion, and the six core portions are disposed to form a regular hexagon around outside the one of the core portions.

The mode field diameter of each of the core portion of the multi-core EDF 106 is approximately 7.3 μm at a wavelength of 1580 nm. A cutoff wavelength measured by using a 2-meter-length sample is 1050 nm as an average of the seven core portions. A separation distance between the core portions is 45 μm, and an outer diameter of the inner cladding potion is 180 μm. The core portion is doped with Er so that a loss coefficient at a wavelength of 1550 nm is 3.4 dB/m and a small-signal-gain coefficient is 4.3 dB/m. Cross-talk of light of each of the cores between cores of the multi-core EDF 106 is equal to or lower than −40 dB at a wavelength of 1640 nm and a length of 16 m. The multi-core EDF 106 is 100 m in length, and its length is adjusted for making the signal light at a wavelength of 1570 nm to 1610 nm to be subjected to optical amplification preferably.

The pumping LD 105 is, for example, a semiconductor LD, and outputs a multi-mode pumping light at a wavelength of 980 nm to the optical coupling structure 130.

The optical coupling structure 130 is configured by optical fibers 131a and 131b which are single mode optical fibers connected to the WDM couplers 103 and 104 respectively, an optical fiber 131c which is a multi-mode optical fiber connected to the pumping LD 105, a multi-core EDF 131d which is one of end portions of the multi-core EDF 106, lenses 133a, 133b, and 133c as first lenses which are disposed to correspond to the optical fibers 131a, 131b, and 131c, and a lens 134 as a second lens which is disposed to correspond to the multi-core EDF 131d. The core portions of the optical fibers 131a, 131b, and 131c configure the plurality of first core portions.

The optical coupling structure 140 is configured by optical fibers 141a and 141b which are single mode optical fibers connected to the WDM couplers 107 and 108 respectively, a multi-core EDF 141d which is the other one of the end portions of the multi-core EDF 106, a lens 144 as a first lens which is disposed to correspond to the multi-core EDF 141d, and lenses 143a and 143b as second lenses which is disposed to correspond to the optical fibers 141a and 141b. The core portions of the optical fibers 141a and 141b configure the plurality of second core portions. The lenses 134 and 144 are configured by, for example, a spherical lens, an aspherical lens, or a GRIN lens.

The WDM coupler 107 transmits therethrough and outputs the signal lights amplified by the multi-core EDF 106 to the optical isolator 109 as explained hereinafter. Similarly, the WDM coupler 108 transmits therethrough and outputs the signal lights amplified by the multi-core EDF 106 to the optical isolator 110. The optical isolators 109 and 110 are connected to an optical selective switch 200. The optical selective switch 200 is configured to be capable of selecting an arbitrary one of signal lights outputted from the optical isolators 109 and 110 and outputting the selected signal light to the optical spectrum analyzer OSA.

In the optical coupling structure 130, the lens 133a collimates a signal light S31 from the tunable laser source LS1, which is outputted from the optical fiber 131a. The lens 133b collimates a signal light S32 from the tunable laser source LS2, which is outputted from the optical fiber 131b. The lens 133c collimates a pumping light P31 from the pumping LD 105, which is outputted from the optical fiber 131c.

The lens 134 is configured to focus the collimated signal lights S31 and S32 to predetermined core portions of the multi-core EDF 131d collectively.

The signal light S31 is focused to the center one of the seven core portions, and the signal light S32 is focused to one of the core portions disposed outside. In addition, the lens 134 makes the collimated pumping light P31 input into the inner cladding potion of the multi-core EDF 131d. By doing this, each core portion of the multi-core EDF 106 is pumped optically, and the signal lights S31 and S32 coupled to the predetermined ones of the core portions of the multi-core EDF 106 are subjected to optical amplification while propagating through the core portions.

In the optical coupling structure 130, optical coupling is realized between the optical fibers 131a, 131b, and 131c and the multi-core EDF 131d by focusing the signal lights S31 and S32 outputted from each core portion of the optical fibers 131a, 131b, and 131c collectively to the corresponding core portion of the multi-core EDF 131d by the lens 134 in one piece. This can reduce the number of components constituting the optical coupling structure, and simplify the configuration.

On the other hand, in the optical coupling structure 140, the lens 144 is configured to collectively collimate the signal lights S31 and S32 which are subjected to optical amplification by the multi-core EDF 106. The lens 143a focuses the collimated signal light S31 to the core portion of the optical fiber 141a. Similarly, the lens 143b focuses the collimated signal light S32 to the core portion of the optical fiber 141b.

In the optical coupling structure 140, optical coupling is realized between the optical fibers 141a and 141b and the multi-core EDF 141d by collimating the signal lights S31 and S32 outputted from the core portions of the multi-core EDF 141d collectively by the lens 144 in one piece. By doing this, the number of components constituting the optical coupling structure can be reduced, and the configuration can be simplified.

Herein, regarding the lens 134, in some cases, there is a relationship of trade-off between efficiency in optically coupling the signal lights S31 and S32 to the core portion of the multi-core EDF 131d and efficiency in optically coupling the pumping light P31 to the inner cladding potion of the multi-core EDF 131d. That is, there is a case that, when the focusing position of the lens 134 is adjusted to enhance efficiency in optically coupling the signal lights S31 and S32 to the multi-core EDF 131d, efficiency in optically coupling the pumping light P31 to the inner cladding potion of the multi-core EDF 131d decreases. On the other hand, there is a case that, when the focusing position of the lens 134 is adjusted to enhance efficiency in optically coupling the pumping light P31 to the inner cladding potion of the multi-core EDF 131d, efficiency in optically coupling the signal lights S31 and S32 to the core portion of the multi-core EDF 131d decreases, and cross-talk between cores of each of the cores deteriorates.

In the following measurement, the focusing position of the lens 134 was adjusted so that, when signal light is at a wavelength of 1580 nm to 1610 nm, gain which is obtained by the multi-core EDF 106 is equal to or greater than 15 dB and cross-talk of light between cores of each of the cores of the multi-core EDF 106 is equal to or smaller than −30 dB. In this state of the optical coupling structure 130, coupling losses of the pumping light P31 and the signal lights S31 and S32 were approximately 10 dB respectively.

Herein in a state that a signal light is not inputted into the optical fiber amplifier 100 and the pumping light is outputted from the pumping LD 105, amplified spontaneous emission (ASE) spectrum was measured by the optical spectrum analyzer OSA. It should be noted that the power of a light outputted from the pumping LD 105 was set so that the pumping light of which optical power is 4.5 W is inputted into the inner cladding potion of the multi-core EDF 106. It is estimated that the pumping light of which optical power is 450 mW, which is 1/10 of 4.5 W is inputted into each core portion of the multi-core EDF 106.

In addition, for comparison, ASE spectrum was measured by using a single mode LD at a wavelength of 980 nm as a pumping light source and inputting the pumping light into a specific one of the core portions of the multi-core EDF 106 for pumping. The optical power of the pumping light inputted into the core portion in this situation was set at 450 mW.

Figure 13:
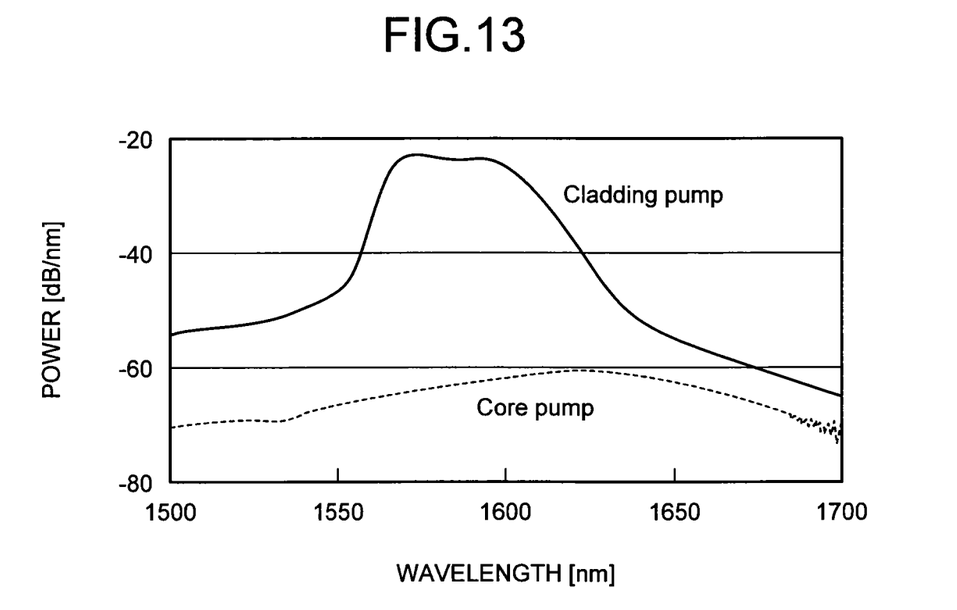
FIG. 13 is a drawing showing ASE spectra.

FIG. 13 is a drawing showing an ASE spectrum in the optical fiber amplifier 100. A legend "cladding pump" indicates a case that the pumping light is inputted into the inner cladding potion, and a legend "core pump" indicates a case that the pumping light is inputted into the specific one of the core portions. As shown in FIG. 13, in case of the "core pump", since the pumping light is inputted into the facet of the core portion, the core portion cannot be pumped sufficiently over the longitudinal direction of the multi-core EDF 106, and the power of ASE was low. On the other hand, in case of the "cladding pump", since the pumping light pumps each core portion gradually over the longitudinal direction of the multi-core EDF 106 while propagating in the inner cladding potion, the power of ASE was high.

Next, the signal light S31 at a wavelength of 1590 nm was inputted into the optical fiber amplifier 100 from the tunable laser source LS1, and the signal light S32 at a wavelength of 1591 nm was inputted into the optical fiber amplifier 100 from the tunable laser source LS2, and then optical gain characteristics were measured. Optical powers of the signal lights S31 and S32 were set so that optical powers inputted into the multi-core EDF 106 were −15 dBm. In the following, the center one of the core portions into which the signal light S31 is inputted is described as "Core A" or "Inner Core", and the outer core portions into which the signal light S32 is inputted is described as "Core B" or "Outer Core".

Figure 14:
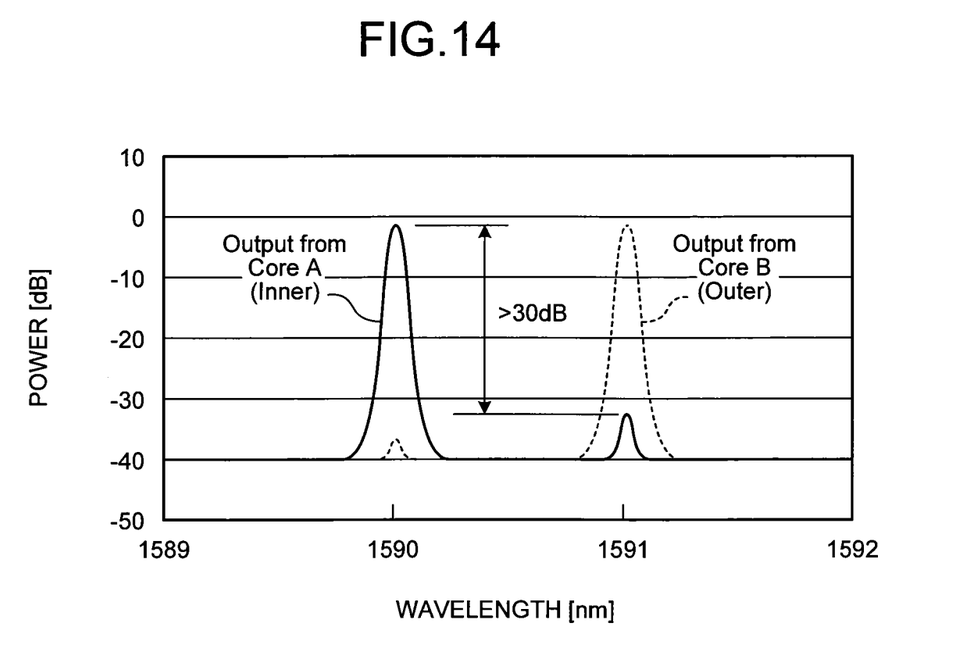
FIG. 14 is a drawing showing spectra of outputted signal lights.

FIG. 14 is a drawing showing spectra of outputted signal lights when measuring optical gain characteristics. In FIG. 14, a solid line indicates an output spectrum in case that the signal light S31, outputted from the optical isolator 109 and selected with the optical selective switch 200 and then made output to the optical spectrum analyzer OSA, was measured. A solid line indicates an output spectrum in case that the signal light 532, outputted from the optical isolator 110 and selected with the optical selective switch 200 and then made output to the optical spectrum analyzer OSA, was measured. In addition, the vertical axis indicates relative power.

As shown in FIG. 14, regarding each signal light, although a signal light is outputted slightly from a core portion which is different from a core portion into which the signal light is inputted because of cross-talk of light, the cross-talk of light was equal to or lower than −30 dB (difference was equal to or greater than 30 dB).

Figure 15:
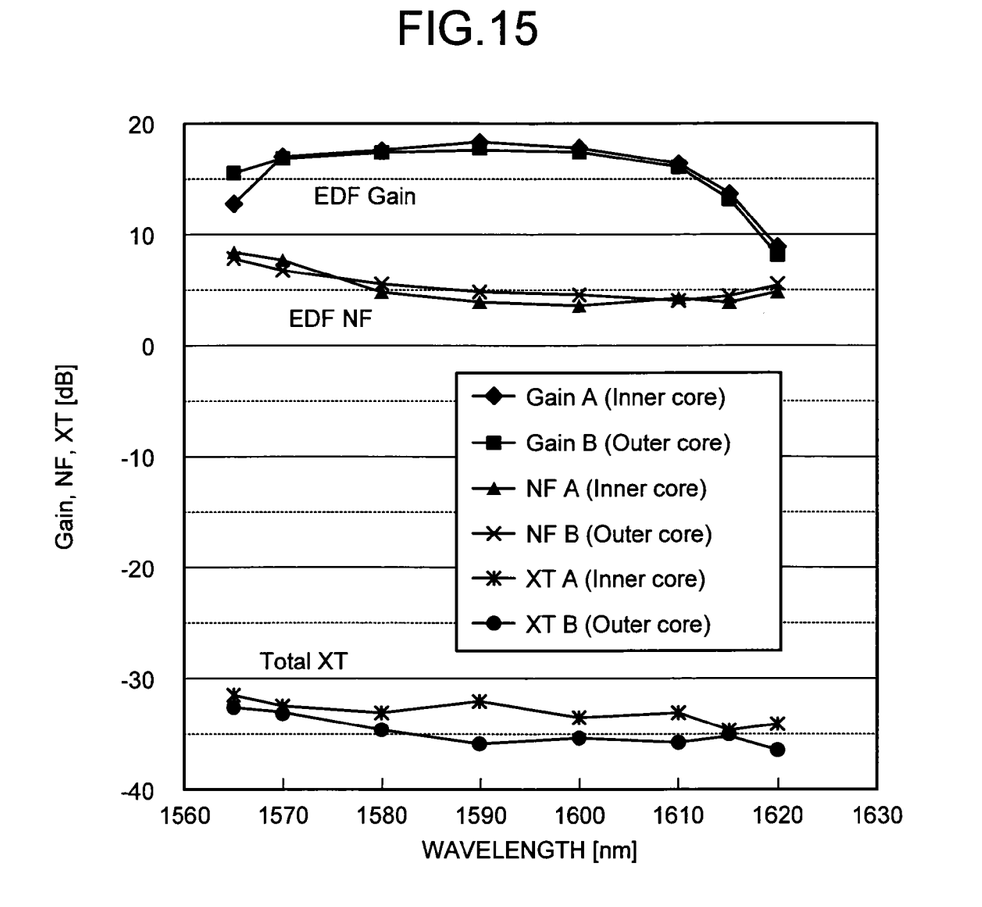
FIG. 15 is a drawing showing dependencies of gain, NF, and cross-talk on wavelength.

Next, gain, noise figure (NF), and cross-talk were measured while varying the wavelengths of the signal lights S31 and S32. FIG. 15 is a drawing showing dependencies of gain, NF, and cross-talk (XT) on wavelength. It should be noted that gain and NF are gross values for the multi-core EDF 106, and cross-talk is a value for the optical fiber amplifier 100. As shown in FIG. 15, in each core portion of "Inner Core" and "Outer Core", gain higher than 15 dB, NF lower than 5.5 dB, and cross-talk smaller than −30 dB were obtained for the signal light of which wavelength is 1580 nm to 1610 nm.

Figure 16:
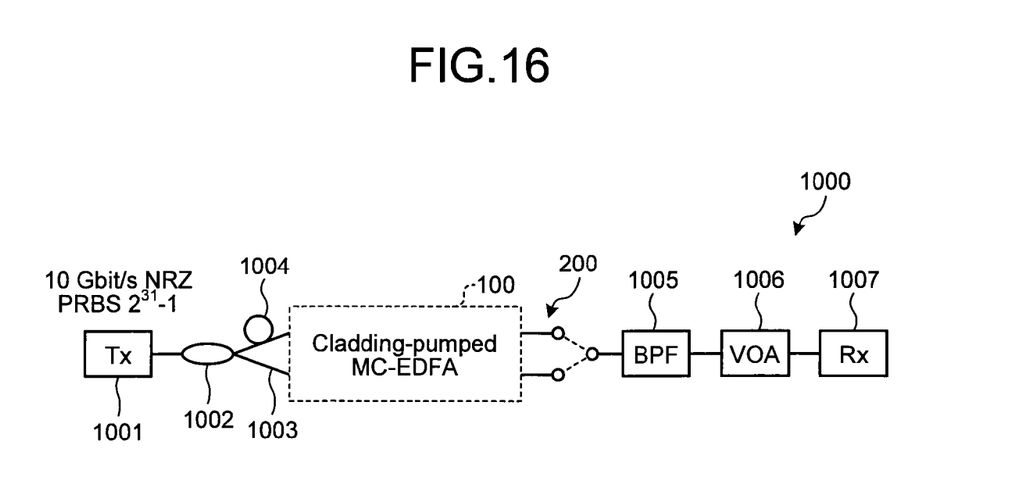
FIG. 16 is a drawing showing a measurement system for bit error rate.

Next, bit error rate was measured for the optical fiber amplifier 100. FIG. 16 is a drawing showing a measurement system for bit error rate. A measurement system 1000 is configured by a signal light source 1001 capable of outputting a signal light of which wavelength is 1590 nm and to which a 10 Gbit/s non-return-to-zero (NRZ) signal of which pseudorandom binary sequence (PRBS) length is 231-1 is superimposed, a 3-dB coupler 1002 dividing the signal light outputted from the signal light source 1001 into two, an optical fiber 1003 for generating two decorrelated signal lights from the two divided signal lights, an optical fiber 1004 as a delay line by 5 ns, the optical fiber amplifier 100 to be measured, the optical selective switch 200, a band-pass optical filter 1005 transmitting therethrough a signal light of which wavelength is 1590 nm, a variable optical attenuator 1006, an optical receiver 1007, and a bit error rate measurement instrument, not shown in the drawings, connected to the optical receiver 1007.

The optical fiber amplifier 100 was operated under operation condition that the optical power of the signal light inputted into the multi-core EDF 106 was −15 dBm and the optical power of the amplified signal light outputted from the multi-core EDF 106 was +3 dBm. In addition, bit error rate was measured by inputting the signal light into "Core A" and "Core B" used when measuring the above-described gain characteristics.

Figure 17:
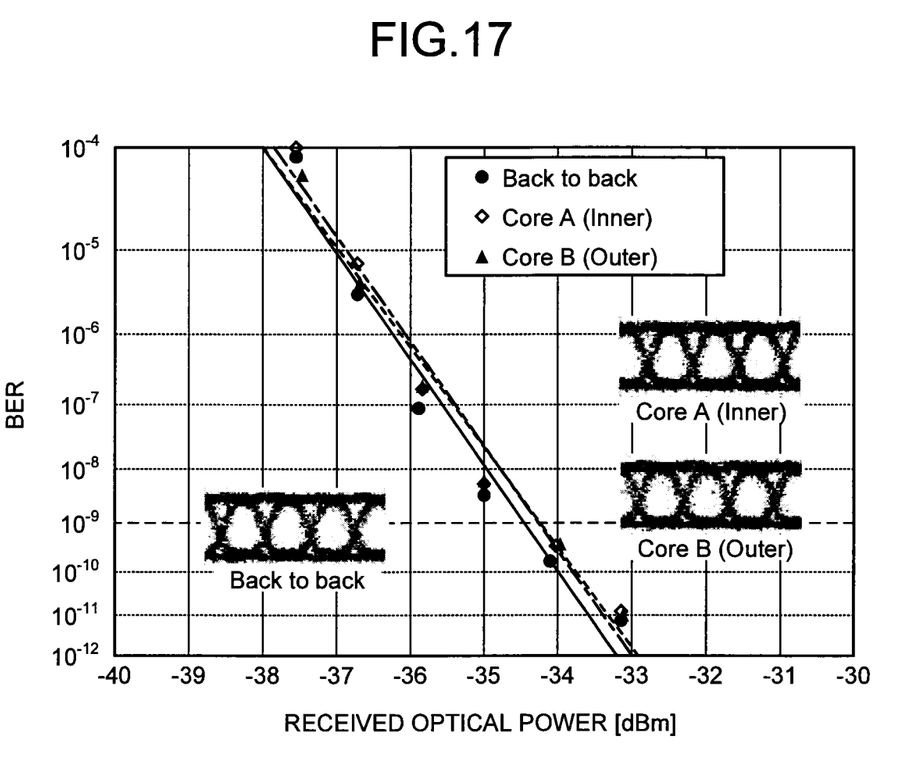
FIG. 17 is a drawing showing bit error rate characteristics.

FIG. 17 is a drawing showing bit error rate characteristics. The horizontal axis indicates received optical power in the optical receiver 1007. As shown in FIG. 17, power penalty to "Back to back" when bit error rate (BER) is 10-9 was smaller than 1 dB to a sufficient degree for either one of the "Core A" and "Core B". In addition, although FIG. 17 shows eye patterns for "Back to back" and at times of optical amplification by "Core A", and "Core B", deterioration of the eye patterns by optical amplification was not observed. Thereby, it was confirmed that the optical fiber amplifier 100 is capable of optical amplification without deteriorating the signal light.

It should be noted that, although the optical fiber amplifier 100 according to the above-described embodiments is configured as forward pumping type, configuration of backward pumping type or bi-directional pumping type may be adopted. In addition, in the optical fiber amplifier 100 according to the above-described embodiments, the number of signal lights to be inputted is two, it may be configured to input seven signal lights in accordance with the number of the core portions of the multi-core EDF 106. In addition, the number of pumping LDs to be used is not limited to one, and it may be configured to input pumping lights from a plurality of pumping LDs to the multi-core EDF 106. In addition, an optical fiber amplifier may be configured by using the optical coupling structures 20, 20A, or 20B shown in FIG. 6, FIG. 7 or FIG. 9, for example.

Also, it should be noted that the above-described embodiments do not limit the present invention. The present invention includes a configuration in which the above-described elements of the above-described embodiments are combined preferably. Furthermore, the present invention includes all of other embodiments, embodiment examples, and operational technologies etc. carried out based on the above-described embodiments by an ordinary skill person in the art.

As described above, the optical coupling structure and the optical fiber amplifier according to the present invention are suitable for use in mainly optical communication.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical coupling structure optically coupling a plurality of core portions and a plurality of core portions, the optical coupling structure comprising:
   a plurality of first core portions outputting a plurality of lights;
   a first lens focusing or collimating the plurality of lights outputted from the plurality of first core portions;
   a second lens focusing the plurality of lights focused or collimated by the first lens;
   a plurality of second core portions, the plurality of lights focused by the second lens being inputted into the second core portions respectively;
   an optical functional component disposed between the first lens and the second lens, the plurality of lights being inputted into the optical functional component; and
   a pumping-light-introducing core portion outputting a pumping light for optically pumping a rare earth element, wherein
   at least one of the first lens and the second lens is configured by a lens or a lens group focusing or collimating the plurality of lights collectively,
   one of the plurality of the first core portions and the plurality of the second core portions is doped with the rare earth element and configures a multi-core optical fiber,
   the multi-core optical fiber comprises an inner cladding portion formed at outer peripheries of the plurality of core portions doped with the rare earth element and an outer cladding portion formed at an outer periphery of the inner cladding portion,
   the optical functional component is an optical filter inputting the pumping light outputted from the pumping-light-introducing core portion into the inner cladding portion,
   the pumping-light-introducing core portion is a core portion of a multi-mode optical fiber,
   the pumping-light-introducing core portion is disposed at an outer side of the multi-core optical fiber, so that respective facets of the pumping-light-introducing core portion and the multi-core optical fiber are on a same surface, and
   the optical functional component is an optical filter disposed between the plurality of first core portions and the plurality of second core portions, the optical filter being tilted to an optical axis of the multi-core optical fiber.

2. The optical coupling structure according to claim 1, wherein the first lens and the second lens are configured so that an inverted image is formed between the first core portions and the second core portions.

3. The optical coupling structure according to claim 2, wherein an inverted image and an erect image are formed between the first core portions and the second core portions.

4. The optical coupling structure according to claims 1 to 3, wherein at least one of the plurality of the first core portions and the plurality of the second core portions configures a multi-core optical fiber.

5. The optical coupling structure according to claim 1, wherein the optical filter inputs the pumping light into the inner cladding potion so that an optical axis of the pumping light coincides with a center axis of the inner cladding potion of the multi-core optical fiber.

6. An optical fiber amplifier comprising an optical coupling structure optically coupling a plurality of core portions and a plurality of core portions, the optical coupling structure comprising:
   a plurality of first core portions outputting a plurality of lights;
   a first lens focusing or collimating the plurality of lights outputted from the plurality of first core portions;
   a second lens focusing the plurality of lights focused or collimated by the first lens;
   a plurality of second core portions, the plurality of lights focused by the second lens being inputted into the second core portions respectively;
   an optical functional component disposed between the first lens and the second lens, the plurality of lights being inputted into the optical functional component; and
   a pumping-light-introducing core portion outputting a pumping light for optically pumping a rare earth element, wherein
   at least one of the first lens and the second lens is configured by a lens or a lens group focusing or collimating the plurality of lights collectively,
   one of the plurality of the first core portions and the plurality of the second core portions is doped with the rare earth element and configures a multi-core optical fiber,
   the multi-core optical fiber comprises an inner cladding portion formed at outer peripheries of the plurality of core portions doped with the rare earth element and an outer cladding portion formed at an outer periphery of the inner cladding portion,
   the optical functional component is an optical filter inputting the pumping light outputted from the pumping-light-introducing core portion into the inner cladding portion,
   the pumping-light-introducing core portion is a core portion of a multi-mode optical fiber,
   the pumping-light-introducing core portion is disposed at an outer side of the multi-core optical fiber, so that respective facets of the pumping-light-introducing core portion and the multi-core optical fiber are on a same surface, and
   the optical functional component is an optical filter disposed between the plurality of first core portions and the plurality of second core portions, the optical filter being tilted to an optical axis of the multi-core optical fiber.

7. The optical coupling structure according to claim 1, wherein the optical functional component reflects the pumping light outputted from the pumping-light-introducing core portion and inputs the pumping light into the inner cladding potion, and the optical functional component is disposed so as not to interfere with the plurality of lights.

8. The optical coupling structure according to claim 1, wherein the optical functional component inputs the pumping light into the inner cladding potion such that an optical axis of the pumping light is tilted to the optical axis of the multi-core optical fiber.

9. The optical coupling structure according to claim 1, wherein the optical functional component is disposed between the first lens and the second lens.

10. The optical coupling structure according to claim 1, wherein the optical coupling structure further comprising another optical functional component disposed between the first lens and the second lens.

* * * * *